(12) United States Patent
Matson et al.

(10) Patent No.: US 8,082,106 B2
(45) Date of Patent: Dec. 20, 2011

(54) 3D SURFACE RELATED MULTIPLE ELIMINATION FOR WIDE AZIMUTH SEISMIC DATA

(75) Inventors: Kenneth H. Matson, Houston, TX (US); John T. Etgen, Houston, TX (US); Phuong Vu, Houston, TX (US)

(73) Assignee: BP Corporation North America Inc., Houston, TX (US)

( * ) Notice: Subject to any disclaimer, the term of this patent is extended or adjusted under 35 U.S.C. 154(b) by 752 days.

(21) Appl. No.: 12/179,975

(22) Filed: Jul. 25, 2008

(65) Prior Publication Data

US 2009/0048784 A1 Feb. 19, 2009

Related U.S. Application Data

(60) Provisional application No. 60/956,278, filed on Aug. 16, 2007.

(51) Int. Cl.
*G01V 1/00* (2006.01)
*G01V 9/00* (2006.01)

(52) U.S. Cl. .......................................... 702/14; 702/13
(58) Field of Classification Search .................. 702/13, 702/14
See application file for complete search history.

(56) References Cited

U.S. PATENT DOCUMENTS

| 4,345,473 A | 8/1982 | Berni |
| 4,363,113 A | 12/1982 | Taner et al. |
| 4,437,175 A | 3/1984 | Berni |
| 4,477,887 A | 10/1984 | Berni |
| 4,520,467 A | 5/1985 | Berni |
| 4,995,007 A | 2/1991 | Corcoran et al. |
| 5,051,960 A | 9/1991 | Levin |
| 5,070,483 A | 12/1991 | Berni |
| 5,109,362 A | 4/1992 | Berni |
| 5,132,938 A | 7/1992 | Walters |
| 5,587,965 A | 12/1996 | Dragoset, Jr. et al. |
| 6,094,620 A | 7/2000 | Gasparotto et al. |
| 6,151,556 A * | 11/2000 | Allen ............................... 702/18 |
| 6,154,705 A | 11/2000 | McCormack et al. |
| 6,178,381 B1 | 1/2001 | Padhi et al. |
| 6,735,527 B1 | 5/2004 | Levin |
| 6,738,715 B2 | 5/2004 | Shatilo et al. |
| 6,747,915 B2 | 6/2004 | Calvert |

(Continued)

FOREIGN PATENT DOCUMENTS

GB 2 451 949 * 2/2009

OTHER PUBLICATIONS

Matson, K.H., "3D Surface Related Multiple Elimination for Wide Azimuth Streamer Seismic Data", London, 2007, 69th EAGE Conference & Exhibition, Jun. 1, 2007, U.K.

(Continued)

*Primary Examiner* — Michael Nghiem
(74) *Attorney, Agent, or Firm* — Albert K. Shung

(57) ABSTRACT

According to a preferred aspect of the instant invention, there is provided herein a system and method for the imaging and monitoring of the subsurface hydrocarbon reservoirs and other subsurface features, wherein the collected seismic data contain multiples therein. In brief, the instant invention is a method of removing multiples using surface-related multiple elimination (SRME), wherein wide azimuth seismic data are used to directly compute a multiple prediction via a mixed space-wavenumber-frequency domain implementation.

18 Claims, 4 Drawing Sheets

U.S. PATENT DOCUMENTS

| | | |
|---|---|---|
| 6,798,714 B1 | 9/2004 | Trickett |
| 6,807,488 B2 | 10/2004 | Van Borselen |
| 6,906,982 B2 | 6/2005 | Calvert |
| 7,050,355 B2 | 5/2006 | Robertsson et al. |
| 7,149,630 B2 | 12/2006 | Abma |
| 7,181,347 B2 | 2/2007 | Moore |
| 2006/0155476 A1* | 7/2006 | Abma .............................. 702/14 |
| 2006/0155477 A1* | 7/2006 | Matson et al. ................... 702/14 |
| 2007/0282535 A1* | 12/2007 | Sirgue et al. .................... 702/14 |
| 2009/0080288 A1* | 3/2009 | Ferber ............................. 367/43 |

OTHER PUBLICATIONS

Matson, et al., "Multiple-Attenuation Methods for Wide-Azimuth Marine Seismic Data", vol. 26, No. 2476, (2007); Aug. 2007, Publisher: SEG Expanded Abstracts, Published in: US.

* cited by examiner

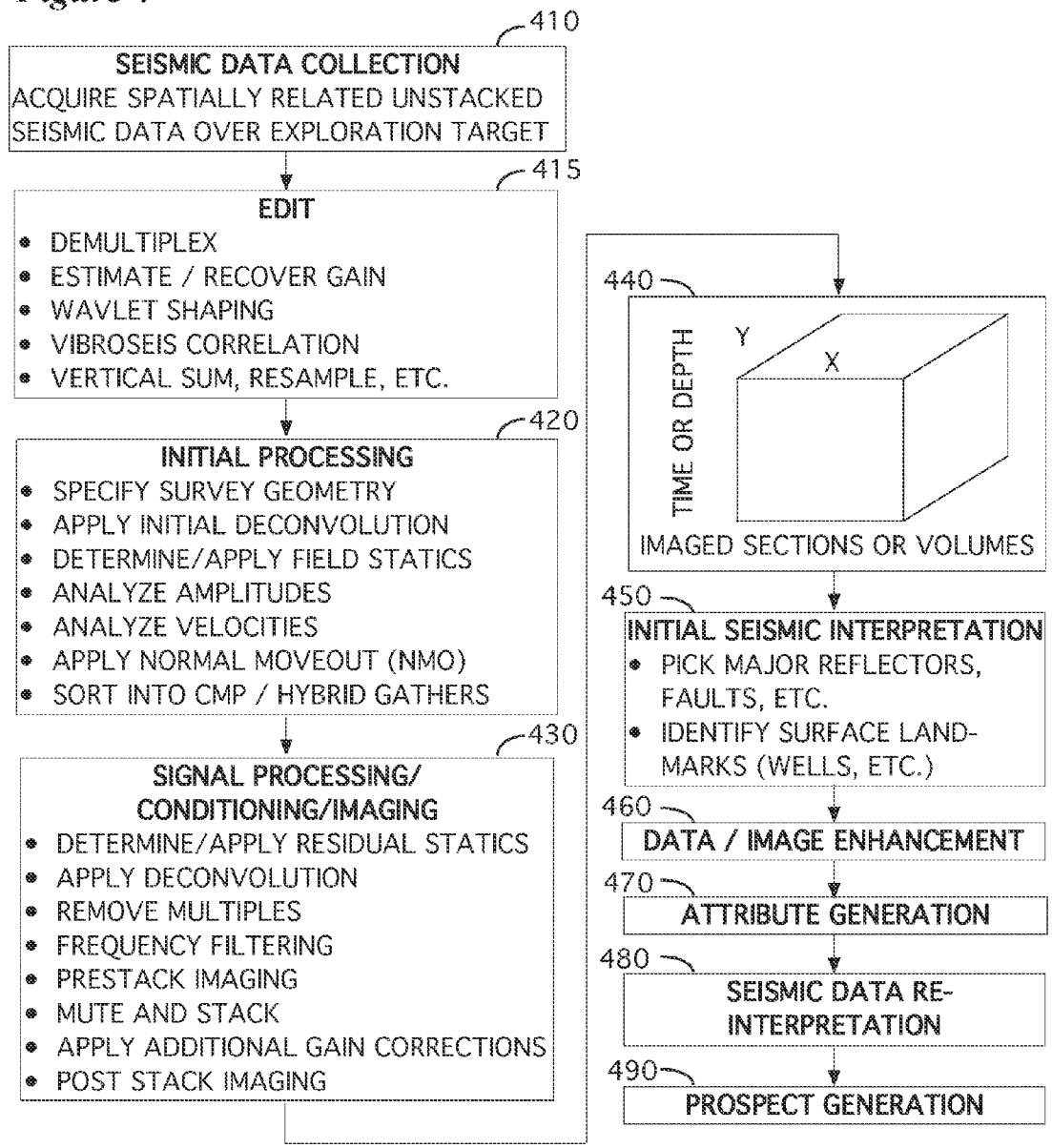

3D SURFACE RELATED MULTIPLE ELIMINATION FOR WIDE AZIMUTH SEISMIC DATA

RELATED CASES

This application claims the benefit of U.S. Provisional Patent Application Ser. No. 60/956,278 filed on Aug. 16, 2007, and incorporates said provisional application by reference into this disclosure as if fully set out at this point.

TECHNICAL FIELD

This invention relates to the general subject of geophysical exploration for hydrocarbons and, in particular, to methods for collecting and analyzing seismic data that evidence multiples therein.

BACKGROUND OF THE INVENTION

A seismic survey represents an attempt to image or map the subsurface of the earth by sending energy down into the ground and recording the "echoes" that return from the rock layers below. The source of the down-going sound energy might come, for example, from explosions or seismic vibrators on land, or air guns in marine environments. During a seismic survey, the energy source is placed at various locations near the surface of the earth above a geologic structure of interest. Each time the source is activated, it generates a seismic signal that travels downward through the earth, is reflected, and, upon its return, is recorded at a great many locations on the surface. Multiple source/recording combinations are then combined to create a near continuous profile of the subsurface that can extend for many miles. In a two-dimensional (2D) seismic survey, the recording locations are generally laid out along a single line, whereas in a three dimensional (3D) survey the recording locations are distributed across the surface in a grid pattern. In simplest terms, a 2D seismic line can be thought of as giving a cross sectional picture (vertical slice) of the earth layers as they exist directly beneath the recording locations. A 3D survey produces a data "cube" or volume that is, at least conceptually, a 3D picture of the subsurface that lies beneath the survey area. In reality, though, both 2D and 3D surveys interrogate some volume of earth lying beneath the area covered by the survey.

A conventional seismic survey is composed of a very large number of individual seismic recordings or traces. In a typical 2D survey, there will usually be several tens of thousands of traces, whereas in a 3D survey the number of individual traces may run into the multiple millions of traces. Chapter 1, pages 9-89, of *Seismic Data Processing* by Ozdogan Yilmaz, Society of Exploration Geophysicists, 1987, contains general information relating to conventional 2D processing and that disclosure is incorporated herein by reference. General background information pertaining to 3D data acquisition and processing may be found in Chapter 6, pages 384-427, of Yilmaz, the disclosure of which is also incorporated herein by reference.

A seismic trace is a digital recording of the acoustic energy reflecting from inhomogeneities or discontinuities in the subsurface, a partial reflection occurring each time there is a change in the elastic properties of the subsurface materials. The digital samples are usually acquired at 0.002 second (2 millisecond or "ms") intervals, although 4 millisecond and 1 millisecond sampling intervals are also common. Each discrete sample in a conventional digital seismic trace is associated with a travel time, and in the case of reflected energy, a two-way travel time from the source to the reflector and back to the surface again, assuming, of course, that the source and receiver are both located on the surface. Further, the surface location of every trace in a seismic survey is carefully tracked. This allows the seismic information contained within the traces to be later correlated with specific surface and subsurface locations, thereby providing a means for posting and contouring seismic data—and attributes extracted therefrom—on a map (i.e., "mapping").

Many variations of the conventional source-receiver arrangement are used in practice, e.g. VSP (vertical seismic profile) surveys, ocean bottom surveys, etc. Further, the surface location of every trace in a seismic survey is carefully tracked and is generally made a part of the trace itself (e.g., as part of the trace header information). This allows the seismic information contained within the traces to be later correlated with specific surface and subsurface locations, thereby providing a means for posting and contouring seismic data—and attributes extracted therefrom—on a map (i.e., "mapping").

For all of the subsurface information that might be acquired via seismic data, this method is not without its problems. For example, one particularly troublesome problem in seismic data collection and analysis is the identification and removal of multiples. Those of ordinary skill in the art will understand that multiples in seismic data occur when the recorded seismic data contain energy that has been reflected more than once in the subsurface. Multiples often appear to all intents and purposes to be valid seismic reflectors and, to the extent that they are interpreted as such, can give rise to incorrect interpretations of the subsurface layer configuration, thereby potentially resulting in the drilling of dry holes.

One method of attenuating multiples that has had some success is known as "surface-related multiple elimination" or "SRME", hereinafter. In brief, this method operates by creating a dataset that contains only predictions of the multiples that are present in the data. Specifically, the method seeks to predict the seismic expression of multiples that have experienced one or more reflections between, for example, the air-water interface and the subsurface. Then, the predicted multiples are subtracted from the original data leaving behind (at least theoretically) only the primary energy.

The application of SRME has provided significant added value to practical processing projects over the last decade, yet the promise of a true 3D solution has been elusive. It has long been known that full 3D SRME multiple prediction is best applied to data coverage with unaliased source and receiver sampling over a full range of azimuths and offsets which is only roughly approximated by the conventional narrow azimuth towed streamer (NATS) 3D seismic data typically available today. In more particular, and has been observed in a variety of different contexts, in order to accurately image complex subsurface structures the structure should be illuminated from a variety of different offsets and azimuths. Wide azimuth surveys have been done for many years and have often proven to yield superior data that can be subsequently migrated or otherwise imaged to produce an improved picture of the subsurface as compared with traditional/narrow azimuth surveys. Where the survey is not designed to acquire wide azimuth information, methodologies designed to estimate the required wide azimuth seismic data from narrow azimuth data have improved the ability to predict complicated out-of-plane multiples (e.g., diffractions) to a limited degree.

Conventional methods for predicting and attenuating surface-related multiples either assume that the subsurface is 2D and thus are applicable only to 2D data shot in the dip direction or they assume that wide azimuth seismic data can be adequately extrapolated from narrow azimuth data to enable a 3D multiple prediction.

Heretofore, as is well known in the geophysical prospecting and interpretation arts, there has been a need for a method of using seismic data to obtain image of the subsurface that does not suffer from the limitations of the prior art. Accordingly, it should now be recognized, as was recognized by the present inventors, that there exists, and has existed for some time, a very real need for a method of geophysical prospecting that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY OF THE INVENTION

According to a preferred aspect of the instant invention, there is provided herein a system and method for the imaging and monitoring of the subsurface hydrocarbon reservoirs and other subsurface features, wherein the collected seismic data contain multiples therein. In brief, the instant invention is a method of removing 3D multiples using SRME, wherein wide azimuth data seismic are used to directly compute the 3D multiple prediction via a mixed space-wavenumber-frequency domain implementation; no direct data extrapolation is used as part of the process.

The instant invention teaches a method of predicting free-surface multiples for wide or multi-azimuth seismic data. The invention is preferably implemented in the space-wavenumber-frequency domain. This provides for the efficient computation of predictions for large data volumes, output of the predicted multiples directly onto the acquisition locations, and sources and receivers that need not be explicitly co-located at or near the surface.

Wide-azimuth towed streamer data presents an opportunity to improve the accuracy of 3D SRME multiple prediction compared to methods that use narrow-azimuth towed streamer data alone. A mixed domain formulation such as that taught herein is well suited for computing 3D multiple predictions for wide azimuth data. Further, no one has heretofore utilized a mixed space-wavenumber-frequency domain approach to 3D SRME.

The foregoing has outlined in broad terms the more important features of the invention disclosed herein so that the detailed description that follows may be more clearly understood, and so that the contribution of the instant inventor to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

Other objects and advantages of the invention will become apparent upon reading the following detailed description and upon reference to the drawings in which:

FIG. 4 contains a schematic illustration of a typical seismic processing process.

DETAILED DESCRIPTION

Figure 1:
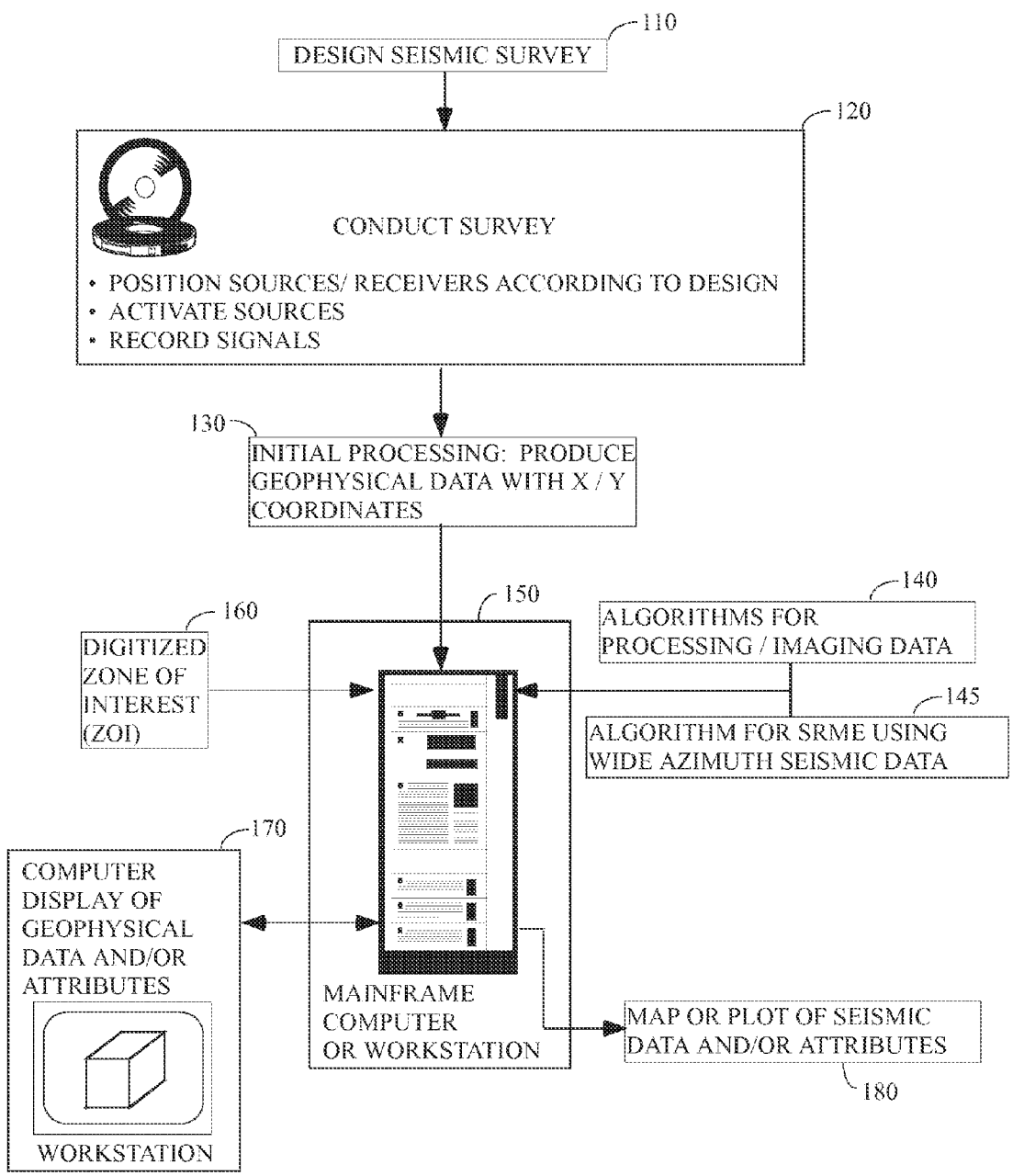
FIG. 1 illustrates the general environment of the instant invention

While this invention is susceptible of being embodied in many different forms, there is shown in the drawings, and will herein be described, some specific embodiments of the instant invention. It should be understood, however, that the present disclosure is to be considered an exemplification of the principles of the invention and is not intended to limit the invention to the specific embodiments or algorithms so described.

General Environment of the Invention

FIG. 1 illustrates the general environment in which the instant invention would typically be used. As a first step, a seismic survey will be designed (step 110), wherein the survey geometry, sample rate, number of sources/receivers, etc. would typically be selected in order to image a preferred subsurface target. Among the many parameters that might be considered in formulating the survey design are:

- The surface area to be covered by the survey;
- Whether the survey will be conducted on land, offshore, or some combination of the two environments;
- The depth of the target;
- The 3-D structure of the target (including its 2-D or 3-D dip, if any);
- Whether the design will utilize an "end on" configuration (wherein all of the active receivers are on the same side of the source) or a "split spread" configuration (i.e., wherein active receivers are placed both ahead of and behind of the source);
- The maximum offset (i.e., in the case where an active source is used the distance from the source to the most distant active receiver) and minimum offset (i.e., the distance from the source to the closest active receiver);
- The receiver-to-receiver spacing;
- The source-point spacing if a controlled source is used (i.e., the shot-to-shot spacing, where "shot" is used in the sense of "source activation point");
- The relation between source-points and receiver-points (e.g., sources near to receivers, sources midway between receivers, etc.);
- The frequencies expected in the received data;
- The strength of the sources, and the sensitivity of the receivers, etc.

Of course, choosing survey parameters such as these for a seismic survey is routinely done with an eye to obtaining the best possible data and such design choices that are well within capability of one of ordinary skill in the art. Further, those of ordinary skill in the art will recognize that many of the previous parameters are interrelated (e.g., specification of the target depth determines in a general way a preferred maximum offset, etc.).

Next, equipment (including geophones and/or hydrophones or other seismic receivers, as well as recording instruments, etc.) will be typically moved to and set up in the field at least approximately according to the planned survey design 110. Next, and as is described more fully below, a survey will be conducted 120 that is preferably at least approximately in accordance with the original design. Of course, it is certainly possible that on-site changes will need to be made to the survey as-designed. However, generally speaking the goal of the field crew is to replicate the parameter choices of the survey designer as closely as is possible.

After positioning the source and receivers, the data will preferably be collected conventionally depending on the sort of survey that is being taken. For example, if a controlled source survey is conducted each source activation might be accompanied by 8 seconds or so of recording at a 2 ms sample interval, with the exact length of each recording and sample rate being depending on a number of factors well known to those of ordinary skill in the art.

As is typical in seismic surveys, the source will be activated and the resulting seismic signals sensed by the receivers and converted to electrical energy which is subsequently digitized and recorded. The response of each receiver or receiver group to the source will preferably be captured digitally as a function of time and stored on optical, magnetic, or other media in computer readable form for transportation to a centralized computing facility where the data will be processed, interpreted, and integrated into other data taken over the same prospect. That being said, in some instances some amount of initial processing 130 will be applied to the data while it is in the field. For example, such in-field processing might be done in order to verify the quality of the data that are being collected. In other instances, the data might be processed to see whether or not the target subsurface rock units are being imaged adequately. In any case, after field processing the data will usually at least be relatable to specific locations on the surface of the earth.

Although the data that are collected according to the instant invention may be processed to some extent in the field (step 130), eventually it will typically be transferred to a processing center where more computing resources 150 and algorithms 140 are available. In the processing center a variety of processes 140 might be applied to the data to make them ready for use by the explorationist. At some point the processed data traces will likely be stored, by way of example only, on hard disk, magnetic tape, magneto-optical disk, DVD disk, or other mass storage means.

The methods disclosed herein would best be implemented in the form of a computer program 140 that has been loaded onto a programmable computer 150 where it is accessible by a seismic interpreter or processor. Note that a programmable computer 150 would typically include, in addition to workstations, mainframes, and super computers, networks of individual computers that provide for parallel and massively parallel computations, wherein the computational load is distributed between two or more processors. As is also indicated in FIG. 1, in some preferred embodiments a digitized zone of interest model 160 would be specified by the user and provided as input to the processing computer program. In the case of a 3-D geophysical data, the zone of interest 160 would typically include specifics as to the lateral extent and thickness (which might be variable and could be measured in time, depth, frequency, etc.) of a subsurface interval. The exact means by which such zones are created, picked, digitized, stored, and later read during program execution is unimportant to the instant invention and those skilled in the art will recognize that this might be done any number of ways.

The algorithms that are used to process the seismic data might be conveyed into the computer 150 by means of, for example, a floppy disk, a magnetic disk, a magnetic tape, a magneto-optical disk, an optical disk, a CD-ROM, a DVD disk, a RAM card, flash RAM, a RAM card, a PROM chip, or loaded over a network.

Similarly, algorithms to implement a preferred embodiment of the instant invention 145 will preferably be loaded into the computer 150 by any conventional or unconventional means of conveying computer source or object code.

After the seismic data has been subjected to the processes discussed herein, the resulting information will likely be displayed either on a high-resolution color computer monitor 170 or in hard-copy form as a printed section or a map 180. The geophysical interpreter would then use the displayed images to assist him or her in identifying subsurface features conducive to the generation, migration, or accumulation of hydrocarbons.

Turning next to FIG. 4, as was indicated previously the instant invention will preferably be made a part of and incorporated into a seismic processing sequence. Those of ordinary skill in the art will recognize that the processing steps illustrated in FIG. 4 are only broadly representative of the sorts of processes that might be applied to seismic data and the choice and order of the processing steps, and the particular algorithms that have been selected, may vary markedly depending on the individual seismic processor, the signal source (dynamite, vibrator, etc.), the survey location of the data (land, sea, etc.), the company that processes the data, etc.

As a first step, and as is generally illustrated in FIG. 4, a 2D or 3D seismic survey is conducted over a particular volume of the earth's subsurface (step 410). The data collected in the field consist of individual unstacked (i.e., unsummed or prestack) seismic traces which contain digital signals representative of the volume of the earth that has been surveyed. Methods by which such data are obtained and processed into a form suitable for use by seismic processors and interpreters are well known to those of ordinary skill in the art.

The purpose of a seismic survey is to acquire a collection of spatially related seismic traces over or proximate to a subsurface target of some potential economic importance. Data that are suitable for analysis by the methods disclosed herein might consist of, for purposes of illustration only, an unstacked 2-D seismic line, an unstacked 2-D seismic line extracted from a 3D seismic survey or, preferably, an unstacked 3D portion of a 3D seismic survey. The invention disclosed herein is most effective when applied to a group of unstacked seismic traces that have an underlying spatial relationship with respect to some subsurface geological feature. Again, for purposes of illustration only, the discussion that follows will be couched in terms of traces contained within a 3-D survey, although any assembled group of spatially related seismic traces could conceivably be used.

After the seismic data are acquired, they are typically taken to a processing center where some initial or preparatory processing steps are applied to them. As is illustrated in FIG. 4, a common early step 415 is designed to edit the input seismic data in preparation for subsequent processing (e.g., digitization, demux, wavelet shaping, bad trace removal, etc.). This might be followed by specification of the geometry of the survey (step 420) and storing of a shot/receiver number and a surface location as part of each seismic trace header. Once the geometry has been specified, it is customary to perform a velocity analysis and apply an NMO (normal move out) or similar correction to adjust each trace in time in order to account for signal arrival time delays caused by offset. Note, of course, that some or all of these steps (and those that follow) might be performed in the field before the data are brought back to the processing center where greater computer resources are typically available.

After the initial pre-stack processing has been completed, it is customary to condition the seismic signal that is located within the unstacked seismic traces before creating stacked (or summed) data volumes (step 430). In FIG. 4 step 430 contains a typical "Signal Processing/Conditioning/Imaging" processing sequence, but those skilled in the art will recognize that many alternative processes could be used in place of the ones listed in the figure. In any case, the ultimate goal from the standpoint of the explorationist is generally the production of a stacked seismic volume or, in the case of 2D data, a stacked seismic line for use in the exploration for hydrocarbons within the subsurface of the earth. As will become apparent hereinafter, the methods of the instant invention would most likely be applied as in connection with step 430, i.e., multiple attenuation or removal.

As is suggested in FIG. 4, any digital sample within a stacked seismic volume is uniquely identified by an (X, Y, TIME) triplet, with the X and Y coordinates representing a position on the surface of the earth, and the time coordinate measuring a recorded arrival time within the seismic trace (step 440). For purposes of specificity, it will be assumed that the X direction corresponds to the "in-line" direction, and the Y measurement corresponds to the "cross-line" direction, as the terms "in-line" and "cross-line" are generally understood in the art. Although time is a preferred and most common vertical axis unit, those skilled in the art understand that other units are certainly possible might include, for example, depth or frequency. Additionally, it is well known to those skilled in the art that it is possible to convert seismic traces from one axis unit (e.g., time) to another (e.g., depth) using standard mathematical conversion techniques.

The explorationist may do an initial interpretation 450 of the resulting stacked volume, wherein he or she locates and identifies the principal reflectors and faults wherever they occur in the data set. This might be followed by additional data enhancement 460 and/or attribute generation (step 470) of the stacked or unstacked seismic data. In many cases the explorationist will revisit his or her original interpretation in light of the additional information obtained from the data enhancement and attribute generation steps (step 480). As a final step, the explorationist will typically use information gleaned from the seismic data together with other sorts of data (magnetic surveys, gravity surveys, satellite data, regional geological studies, well logs, well cores, etc.) to locate subsurface structural or stratigraphic features conducive to the generation, accumulation, or migration of hydrocarbons (i.e., prospect generation 490). Of course, the ultimate goal is the production of hydrocarbons from the subsurface via a well or other means.

Preferred Embodiments

According to a first preferred embodiment, there is provided a system and method for removing multiples in seismic data using SRME, wherein wide azimuth seismic data are used to directly compute the multiple predictions via a mixed space-wavenumber-frequency domain implementation. In the preferred embodiment, no direct data extrapolation is used as part of the process.

The instant invention relates to the general subject of seismic exploration and, in particular, to methods for removing 3D multiples associated with the surface of the earth. The method is applicable to, but not limited to, wide-azimuth towed streamer seismic data.

Broadly speaking, according to the instant method, 3D multiples are predicted and then subtracted from the measured data which contains the primaries and multiples reflections. In the prior art multiple prediction is implemented either entirely in the space domain or the wavenumber domain. One innovative aspect of the instant invention is the implementation of multiple prediction in a mixed space and wavenumber domain. This has several advantages over typical implementations and/or 3D multiple prediction methods that use a small subset of a wide azimuth dataset. Among these are:

1) The multiples are preferably predicted directly onto the acquired data locations rather than onto an idealized grid;
2) The wavenumbers at the surface can be limited to mitigate aliasing effects;
3) The 3D obliquity factor can be easily incorporated compared to the space-only domain implementation;
4) The sources and receivers do not need to be explicitly co-located at or near the surface; and,
5) The data need not be sorted to compute the multiple prediction.

In a preferred embodiment, the instant algorithm proceeds as is summarized below:

1) Transform the seismic data to the temporal frequency domain using a time-direction Fourier transform;
2) Read the entirety of the acquired seismic data for a single temporal frequency;
3) Select an inline and a crossline wavenumber;
4) Separately transform the data over source and receiver domains for the particular inline and crossline wavenumber;
5) Select a particular output trace location (source and receiver location);
6) Compute the multiple prediction for that output location, the inline and crossline wavenumber and the temporal frequency;
7) Repeat steps 5 and 6 until there are no further output locations;
8) Repeat steps 3-7 for a range of wavenumbers, summing the results;
9) Output all of the output traces for a single frequency;
10) Repeat steps 2-9; and,
11) Inverse transform the output data back to the time domain.

Additional details related to the foregoing will be discussed below in connection with FIG. 2.

In terms of equations, a preferred approach to the WATS 3D SRME problem solved herein is to use a mixed wavenumber formulation to compute the multiple prediction. The conventional (prior art) equation for predicting 3D multiples in the space-frequency domain can be written as:

$$M(x_g, y_g \mid x_s, y_s; \omega) = \sum_y \sum_x D(x_g, y_g \mid x, y; \omega) D(x, y \mid x_s, y_s; \omega),$$

where M is the multiple prediction data, D represents the input data, x and y refer to the trace coordinates, the subscripts s and g refer to source and receiver respectively, and $\omega$ is the angular temporal frequency. This equation clearly shows the need for source and receivers everywhere on the acquisition surface. As was stated above, the current WATS data does not lend itself to the straightforward application of the previous equation.

The instant inventors have determined that the previous equation can be modified to yield a mixed domain formulation, which reformulation is a key representation of the methods taught herein:

$$M(x_g, y_g \mid x_s, y_s; w) = \qquad (1)$$
$$\sum_{k_x} \sum_{k_y} D(x_g, y_g \mid k_x, k_y; w) 2ik_z D(k_x, k_y \mid x_s, y_s; w),$$

where $k_x$ and $k_y$ refer to inline and crossline wavenumbers and $k_z$ represents the vertical wavenumber ($w^2/c^2 - k_x^2 - k_y^2$), where c is the wave velocity at the near surface. The obliquity factor $2ik_z$ is often omitted in 2D and quasi-3D SRME formulations since the improvement in accuracy obtained by including it can be smaller than the kinematic errors produced by inadequate data coverage. In addition, the obliquity factor is often more expensive to incorporate into the space-frequency formulation. However, in the preferred embodiment, when the instant invention is utilized with WATS data, this factor will preferably be included in the multiple estimation method taught herein, although it is not strictly necessary to do so.

Figure 2:
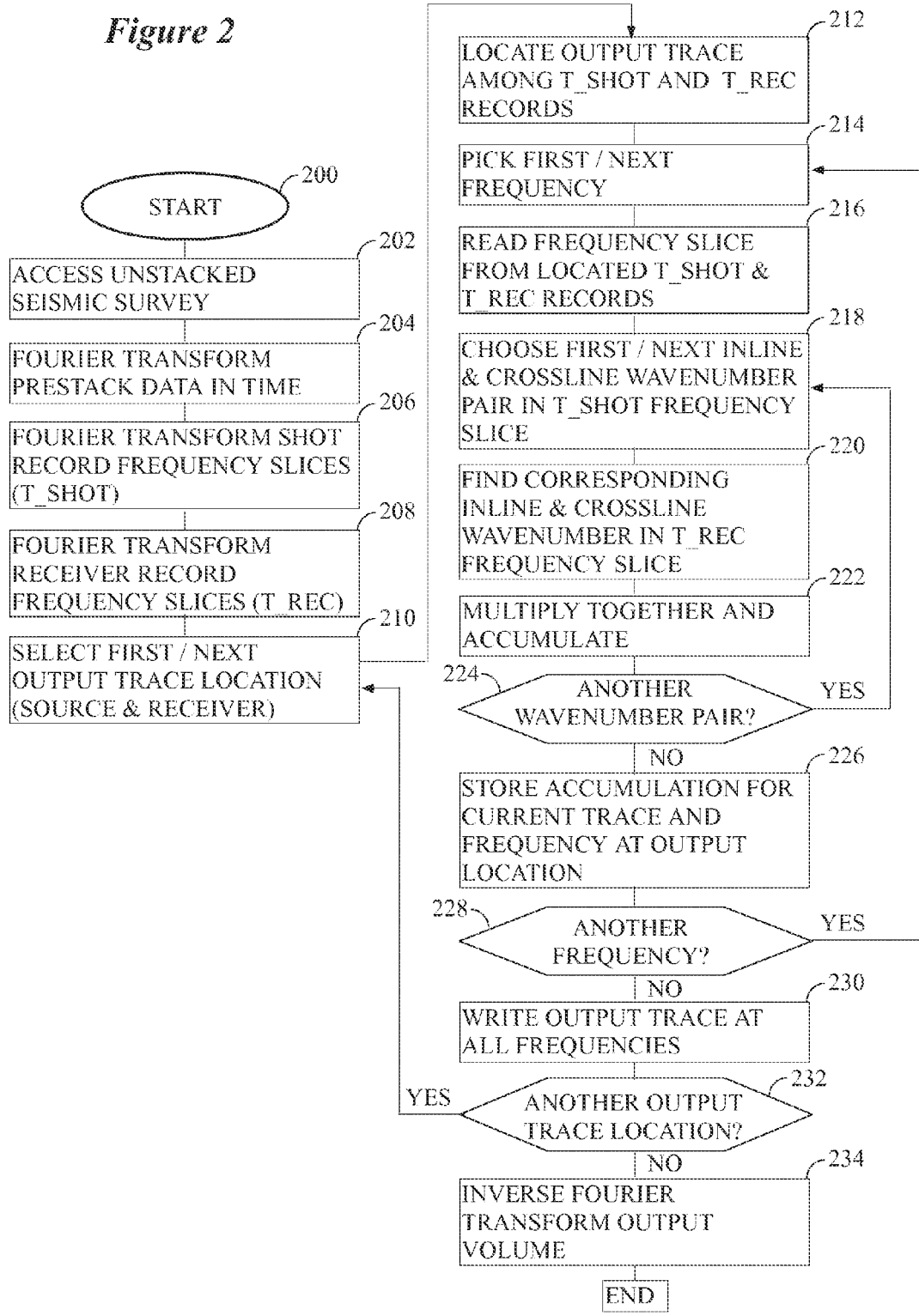
FIG. 2 contains a preferred logic that describes one aspect of the instant invention.

Turning next to a detailed discussion of some preferred steps of the instant invention, attention is drawn to FIG. 2. As an initial matter, note that the embodiment of FIG. 2 has been organized for purposes of clarity in explaining the instant invention and not for purposes of illustrating the most computationally efficient means of calculation. Those of ordinary skill in the art will readily understand how the computational scheme disclosed in this figure could be readily modified to improve its overall efficiency.

Turning to FIG. 2 in detail, as a first preferred step, a computer program will be initialized 200 according to methods well known to those of ordinary skill in the art (e.g., a program will be loaded into memory, variables will be zeroed, files opened, etc.).

As a next preferred step 202, an unstacked seismic survey will be accessed. In some preferred embodiments, the data might be stored locally in memory (e.g., RAM) or on magnetic disk (or optical disk, tape, etc.). In other embodiments, the survey could be stored remotely and accessed via a network. In any case, in the preferred arrangements each seismic trace in the survey that is to be processed via the instant method will be stored as digital information in computer readable form according to a known format (e.g., the data will preferably be stored as individual seismic traces comprising a trace header together with digital signal values). Additionally, it is preferable that the survey be a land or marine 3D survey.

According to a next preferred step 204, the seismic data will be transformed via Fourier transform in the time direction according to methods well known to those of ordinary skill in the art. The calculation might be via a fast Fourier transform, a discrete Fourier transform, etc.

Additionally, it should be noted and remembered that the Fourier transform is a specific example of a class of data transformations known, for purposes of the instant disclosure, as projection transforms, i.e., transforms that calculate projections of data onto a (usually) infinite set of basis functions. More specifically, the Fourier transform is an orthonormal projection transform because its basis functions are orthogonal and normalized to be of unit length/size. Other examples of projection transforms include the cosine transform, sine transform, Walsh transform, wavelet transforms, the Radon transform, etc. Some of these (e.g., the Fourier, cosine, sine, and Walsh) transforms are usually chosen to be orthonormal, whereas others (e.g., the wavelet and Radon transforms) may include basis functions that are not normalized or even be mutually orthogonal. Thus, when the term projection transform is used herein, that term should be interpreted to mean the Fourier transform (in the preferred embodiment) or, more generally, any projection transform of the sort discussed previously. Similarly, when the term projection transform coefficient is used herein, that term should be interpreted to mean a Fourier transform coefficient (in the preferred embodiment) or, more generally, any coefficient obtained by projection (e.g., via least squares or otherwise) of the seismic data onto a particular basis function.

As a next preferred step, a shot record (or equivalently a shot gather) that is comprised of the Fourier transformed seismic traces will be accessed and processed by calculating inline and crossline (2D) Fourier transforms (step 206) separately for each frequency (horizontal) slice, a shot record typically being understood to be a collection of seismic traces that were recorded from the same shot or source excitation. See FIG. 3 and its discussion below for additional details of this computation.

Note that the transform directions "inline" and "crossline" are given as examples only. Those of ordinary skill in the art will recognize that any two (preferably) orthogonal directions could be used including calculating the 2D transform according to an arbitrary "x" and "y" coordinate system. Additionally, it should be noted that in order to perform this calculation is it not necessary for an entire shot record to actually be read into memory at one time (i.e., an actual shot gather need not be formed by sorting the input data as is conventionally done) and the same statement applies to the receiver gathers discussed below. Methods of incrementally reading and processing such datasets so as to operate in the shot, receiver, or other domain without sorting are well known to those of ordinary skill in the art. Thus, whenever it is said herein that a shot, receiver, CMP, etc., record is read or accessed, that language should be broadly interpreted to include instances where the subject data traces are sorted and then read and held entirely in memory as well as those instances where the data traces are arranged according to some other ordering and are accessed sequentially or in parallel. Additionally, it should be noted that it may be necessary in this or the next to create interpolated infill traces to reduce aliasing as is conventionally done.

The Fourier transform that is performed in connection with step 206 is preferably applied to a horizontal slice through the unstacked shot volume at each Fourier frequency, thereby transforming each slice into the wavenumber ($k_x$ and $k_y$) domain, i.e., a 2D transform of the constant frequency slice will preferably be calculated. This process will preferably be performed for every shot record in the survey. Note once again, as was explained previously, that in some preferred embodiments the individual shot records will not be assembled in memory or on disk as there are numerically efficient means of calculating the quantities required herein without sorting the seismic dataset into shot order. After preferably applying this computation to every shot record in the survey, a transformed shot dataset (i.e., the "T_SHOT" dataset in FIG. 2) will be obtained.

As a next preferred step 208, Fourier transformed receiver records (i.e., all of the traces that were recorded by a single receiver) will be accessed and a (horizontal or slice) Fourier transform calculated at each frequency. As before, this process will be preferably repeated for every receiver record in the survey and all frequencies, yielding the T_REC dataset of FIG. 2).

Preferably a loop will next be entered that selects output trace locations (steps 210 through 232, inclusive). Note that the output location 210 will preferably coincide with a seismic trace from the survey, but that is not strictly required.

Next, given the location of an output trace, that trace will be identified within the T_SHOT and TREC datasets (step 212).

As a next preferred step, a loop over frequency will be entered (steps 214 through 228, inclusive), wherein every Fourier frequency (or a selected range of frequencies) will be processed.

Within the frequency loop, the frequency slices from the T_SHOT and T_REC database will preferably be read (step 216) into memory, if they have are not already present there.

Next, preferably the instant invention will loop over inline and crossline wave number (steps 218 through 224, inclusive). Note that this loop is actually two dimensional in its preferred embodiment (i.e., a double loop over $k_x$ and $k_y$ per equation (1) discussed previously) and those of ordinary skill in the art will readily be able to implement such. In some preferred embodiments, the range of each loop might go from negative to positive Nyquist according to a predetermined wavenumber increment (which might potentially be different for the inline and crossline loops). As a specific example and for purposes of illustration only, if the receiver cable were 2000 meters long with receiver groups at intervals of 100 meters, the Nyquist wavenumber would be 1/(2*100) or 1/200. In such a case, an increment approximately equal to 1/(length of the cable) or 1/2000 in this example would be a preferred initial estimate of this parameter value.

Note that there will likely be a tradeoff between the size of the wavenumber increment and the range of wavenumbers considered within the double loop and the quality of the end product. That is, small increments (and wavenumber ranges from 0 to Nyquist) will generally yield at least somewhat better results as compared with larger increments and a restricted range of wavenumbers. However, it is to be expected that the computer run time will increase as the increment decreases. Similarly, if greater wavenumber ranges are used in the calculation, the computer run time will also tend to increase. Those of ordinary skill in the art will be readily able to select these parameters to obtain satisfactory results in a particular case and, indeed, in some instances these parameter choices will need to be selected on a trial-and-error basis.

Preferably, the instant invention will next identify a Fourier transform coefficient at a given inline/crossline location in the T_SHOT dataset (step 218) and a corresponding Fourier coefficient at the same (or approximately so) inline/crossline location within the T_REC dataset (step 220). Of course, if an exact match cannot be located because, for example, of different shot and receiver spacing, such could readily be obtained by interpolation from nearby values.

Figure 3A:
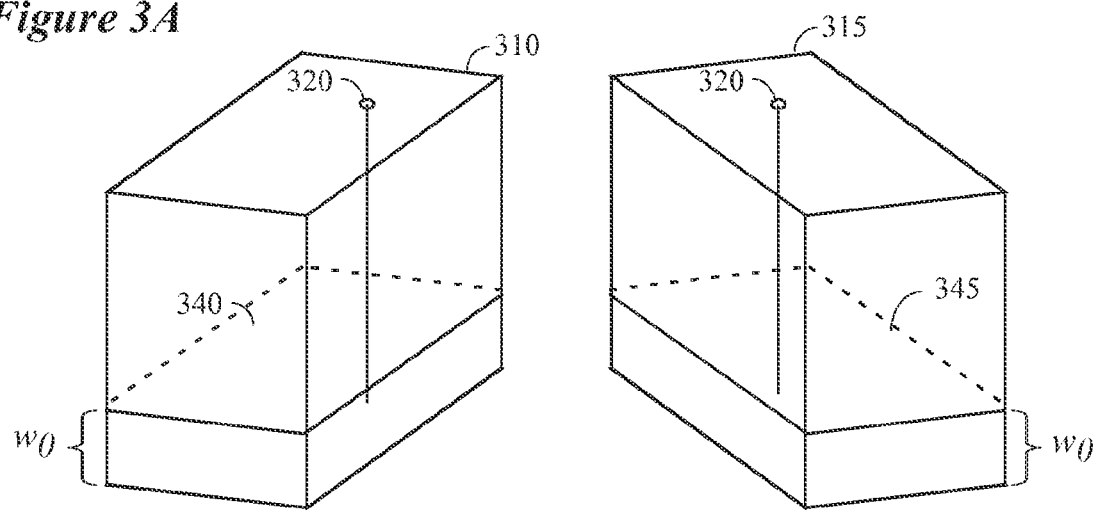
FIGS. 3A and 3B illustrate schematically how Fourier coefficients from a horizontally transformed shot and receiver record are located.
Figure 3B:
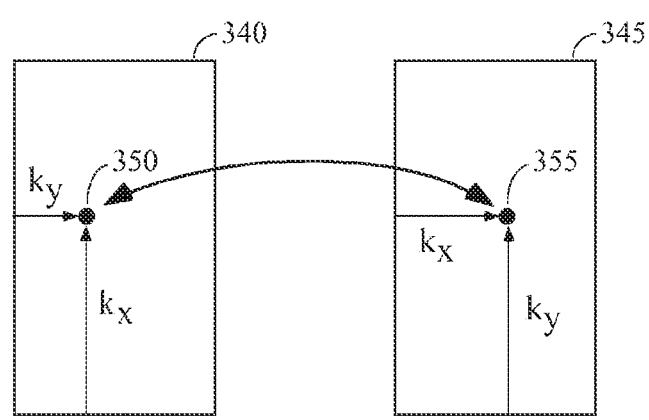

FIGS. 3A and 3B contain a schematic representation of the previous computational steps. In the preferred embodiment, the selected output trace location 320 will be located within the transformed shot gather 310 (T_SHOT) and receiver gather 315 (T_REC) calculated in steps 206 and 208, respectively. At the current frequency $w_0$ in FIG. 3, 2D Fourier transformed slices 340 and 345 will be identified and corresponding shot 350 and receiver 355 transform coefficients (i.e., $D(k_x, k_y|x_s, y_s; w)$ and $D(x_g, y_g|k_x, k_y; w)$ in equation (1)) within each of these slices will be identified and extracted to obtain an estimate of at least one or more multiple reflected signals.

Next, and preferably, the two Fourier transform coefficients 350 and 355 that have been extracted from the shot 310 and receiver 315 gather respectively will be multiplied together, with the product preferably being multiplied by the obliquity factor $2ik_z$ according to equation (1). The product of these quantities will then preferably be added to an accumulator of some sort (e.g., a memory location) per step 222 and a next inline/crossline wavenumber processed within the current frequency slices (the "YES" branch of decision item 224).

After all of the wavenumbers have been processed and accumulated for this frequency (the "NO" branch of decision item 228), preferably the accumulated value for the current frequency will be stored for the current trace (step 226) after which additional frequencies will be similarly processed, with the accumulation trace, which contains one or more frequencies therein, being written to storage (step 230) and identified (e.g., by creating the appropriate trace header entry) with the chosen output trace location per step 210. Of course, the output trace location could be in terms of inline/crossline trace numbers, latitude/longitude, or any arbitrary X/Y coordinate system and trace headers are well suited to associate such information with a seismic trace.

Obviously, the instant process could be repeated for any arbitrary number of output trace locations (e.g., the "YES" branch of decision item 232).

Finally, note that the output of the previous steps of the previous equation produces a frequency domain multiple prediction for each selected location. Once one or more such multiple estimates have been calculated, an inverse Fourier transform would typically be applied to transform the output traces from step 230 from the frequency back to the time domain, at which point the time-domain multiple estimates might be subtracted from (or otherwise used to adjust) the original seismic traces, thereby producing seismic traces in which the multiples have been attenuated or eliminated. Additionally, the multiple estimate itself has independent values and might be studied in its own right to determine the pattern of multiples in the data for purposes of trying to differentiate between primaries and multiples in an unstacked or stacked seismic dataset.

Although the invention disclosed herein has been discussed in terms of seismic traces organized (or organizable) into shot or receiver records or "gathers, that was done for purposes of specificity only and not out of any intent to limit the instant invention to operation on only that sort of trace arrangement. So, within the text of this disclosure, the terms shot and receiver gather are used in the broadest possible sense of that term, and is meant to apply to seismic traces obtained from conventional or unconventional 2-D and 3-D gathers, the most important aspect of a "gather" being that it represents an organized collection of unstacked seismic traces from either a 2-D or 3-D survey all of which have at least one shot location or receiver location at least approximately in common. This definition is specifically intended to encompass surveys where multiple shots are taken at the same location.

Additionally, in the previous discussion, the language has been expressed in terms of operations performed on conventional seismic data. But, it is understood by those skilled in the art that the invention herein described could be applied advantageously in other subject matter areas, and used to locate other subsurface minerals besides hydrocarbons, e.g., coal. By way of additional examples, the same approach described herein could be used to process and/or analyze multi-component seismic data, shear wave data, or model-based digital simulations of any of the foregoing.

It should also be noted that although the phrase "surface survey" has been utilized herein to identify preferred embodiments, that term should be broadly construed to include land surveys wherein the source and receivers are located on the earth's surface, as well as marine surveys where the source/receivers are towed beneath the surface of the water, as well as marine surveys where the source is towed and the receivers are positioned on the bottom of the body of water (e.g., ocean bottom surveys), as well as land surveys where the sources or receivers are positioned at some predetermined depth, etc. Further, in some instances (e.g., VSP surveys) no surface survey will need to be conducted.

Further, although the preferred use of the instant invention is with actual seismic field data, it would also be suitable for work with model-generated data (e.g., synthetic data).

Additionally, it should be noted that while the instant invention operates best on seismic that was obtained from a wide azimuth survey, it would also be useful when used in conjunction with any sort of seismic survey, whether or not collected with a view toward capturing wide azimuth information. Still, in the preferred embodiment a wide azimuth survey will be collected, as it will typically provide better results than one with a narrow range of azimuths. Methods of designing and acquiring wide azimuth surveys are well known to those of ordinary skill in the art.

Still further, it should be noted and remembered that because of the simple relationship between incoming/upcoming waves and down going/outgoing waves at the free surface, the instant invention could be implemented, for example in the ω-k domain (i.e., via the Fourier transform), the ω-p domain (i.e., via the Radon transform where p is a vector ray parameter), the τ-p domain (i.e., the slant stack domain), etc., as those terms and transforms are known and understood in the art. Thus, although it is preferred that the 2D transform that is applied within each frequency (or projection coefficient) shot or receiver slice be a 2D Fourier transform, in some preferred embodiments the 2D transform could be another sort of projection transform of the sort discussed previously.

Additionally, it should be noted and remembered that although a typical Fourier time-direction transform of a collection of seismic traces results in horizontal constant frequency (or other projection coefficient) slices (i.e., the resulting transformed seismic traces all have their Fourier coefficients at the same "depth" or relative array location) that has been done for purposes of clarity and computational convenience only. Thus, when a "slice," a "frequency slice" or a "constant frequency slice" are referred to herein those terms should be broadly construed to include any assemblage of Fourier coefficients corresponding to a single frequency, no matter how they happen to be arranged in memory or how they might happen to be stored on a computer readable storage medium.

While the inventive device has been described and illustrated herein by reference to certain preferred embodiments in relation to the drawings attached hereto, various changes and further modifications, apart from those shown or suggested herein, may be made therein by those skilled in the art, without departing from the spirit of the inventive concept, the scope of which is to be determined by the following claims.

What is claimed is:

1. A method of geophysical exploration, comprising the steps of:
    a. selecting a plurality of seismic traces acquired over a subsurface exploration target, wherein each of said plurality of seismic traces has a location associated therewith, and, wherein said plurality of seismic traces has at least one or more multiple reflected events therein;
    b. calculating a Fourier transform of said plurality of seismic traces, thereby creating a plurality of transformed seismic traces;
    c. selecting an output trace location;
    d. accessing a shot record comprised of a first plurality of said transformed seismic traces, wherein at least one of said transformed seismic traces within said shot record has a location that is proximate to said output trace location;
    e. accessing a receiver record comprised of a second plurality of said transformed seismic traces, wherein at least one of said transformed seismic traces within said receiver record has a receiver location that is proximate to said output trace location;
    f. selecting a frequency slice within said shot record at least approximately corresponding to a selected frequency value, thereby selecting a shot slice;
    g. selecting a frequency slice within said receiver record at least approximately corresponding to said selected frequency value, thereby selecting a receiver slice;
    h. calculating a 2D Fourier transform of said shot slice, thereby obtaining a transformed shot slice;
    i. calculating a 2D Fourier transform of said receiver slice, thereby obtaining a transformed receiver slice;
    j. using at least said transformed shot slice and said transformed receiver slice to obtain an estimate of a Fourier coefficient of at least one of said one or more multiple reflected events at said output trace location;
    k. performing at least steps (f) though (j) at least twice for at least two different selected frequency values, thereby obtaining a plurality of estimates of Fourier coefficients of at least one of said one or more multiple reflected events at said output location;
    l. performing an inverse transform of said plurality of estimates of Fourier coefficients, thereby obtaining an estimate of at least one of said one or more multiple reflected events at said output location; and,
    m. using said estimate of at least one of said one or more multiple reflected events at said output location to explore for hydrocarbons within said subsurface exploration target, and wherein at least one of b, h, i, j, k, or l is performed on one or more computers.

2. The method of geophysical exploration according to claim 1, wherein step (j) comprises the step of:
    (j1) using at least said transformed shot slice and said transformed receiver slice to obtain an estimate of a Fourier coefficient of at least one of said one or more multiple reflected events at said output trace location, wherein said estimate of a Fourier coefficient is determined according to the equation:

$$M(x_g, y_g \mid x_s, y_s; w) = \sum_{k_x} \sum_{k_y} D(x_g, y_g \mid k_x, k_y; w) 2 i k_z D(k_x, k_y \mid x_s, y_s; w),$$

where,
w is said selected frequency value,
$M(x_g, y_g \mid x_s, y_s; w)$ is said estimate of said Fourier coefficient at said selected frequency and at said output trace location,
$D(x_g, y_g \mid k_x, k_y; w;)$ is a 2D Fourier transform coefficient from said transformed shot slice,
$D(k_x, k_y \mid x_s, y_s; w)$ is a 2D Fourier transform coefficient from said transformed receiver slice,
$2 i k_z$ is an obliquity factor,
$x_g$ is an X receiver coordinate,
$y_g$ is a Y receiver coordinate,
$x_s$ is an X shot coordinate,
$y_s$ is a Y shot coordinate,
$k_y$ is an X wavenumber, and,
$k_y$ is a Y wavenumber.

3. The method of geophysical exploration according to claim 1, wherein step (d) comprises the steps of:
  (d1) sorting said transformed seismic traces into a shot order, and,
  (d2) reading a shot record from said sorted transformed seismic traces,
    wherein said read shot record is comprised of a first plurality of said transformed seismic traces, and
    wherein at least one of said transformed seismic traces within said shot record has a location that is proximate to said output trace location.

4. The method of geophysical exploration according to claim 1, wherein step (m) comprises the steps of:
  (m1) numerically subtracting said estimate of at least one of said one or more multiple reflected events from at least one of said plurality of seismic traces, thereby forming a multiple attenuated at least one seismic trace, and,
  (m2) using said at least one multiple attenuated seismic trace to explore for hydrocarbons within said subsurface exploration target.

5. A method, comprising the steps of:
  a. accessing a plurality of seismic traces acquired over a subsurface exploration target, at least one of said plurality of seismic traces containing a representation of one or more multiple reflected signals therein;
  b. calculating a Fourier transform in time of said plurality of seismic traces;
  c. accessing a shot record comprised of at least a first portion of said plurality of Fourier transformed seismic traces, said shot record containing at least one trace proximate to a selected output trace location;
  d. selecting a plurality of shot slices within said shot record, wherein each of said shot slices corresponds to a different Fourier frequency;
  e. calculating a 2D Fourier transform of each of said shot slices, thereby obtaining a plurality of transformed shot slices;
  f. accessing a receiver record comprised of at least a second portion of said plurality of Fourier transformed seismic traces, said receiver record containing at least one trace proximate to said selected output trace location;
  g. for each of said plurality of transformed shot slices, selecting a corresponding receiver slice from within said receiver record, wherein each shot slice and said corresponding receiver slice is associated with a same Fourier frequency;
  h. calculating a 2D Fourier transform of each of said receiver slices, thereby obtaining a plurality of transformed receiver slices;
  i. using at least said plurality of transformed shot slices and said plurality of transformed receiver slices to obtain an estimate of at least one of said one or more reflected signals; and,
  j. writing to a non-transitory computer readable media said estimate of at least one of said one or more multiple reflected signals, and
    wherein at least one of b, e, or h is performed on one or more computers.

6. The method of geophysical exploration according to claim 5, further comprising the steps of:
  k. reading at least a portion of said written estimate of at least one of said one or more multiple reflected signals at said output location, and,
  l. using at least said read portion of said estimate of at least one of said one or more multiple reflected signals at said output location to explore for hydrocarbons within said subsurface exploration target.

7. The method of geophysical exploration according to claim 5, wherein step (f) comprises the steps of:
  (f1) sorting said transformed seismic traces into a receiver order, and,
  (f2) reading a receiver record from said sorted transformed seismic traces, said receiver recording being comprised of at least a second portion of said transformed seismic traces, and,
    said receiver record containing at least one transformed seismic trace with a location proximate to said output trace location.

8. The method of geophysical exploration according to claim 5, wherein step (g) comprises the step of:
  (g1) using at least said plurality of transformed shot slices and said plurality of transformed receiver slices to obtain an estimate of at least one of said one or more multiple reflected signals, wherein said estimate of at least one of said one or more multiple reflected signals is determined according to the equation:

$$M(x_g, y_g \mid x_s, y_s; w) = \sum_{k_x} \sum_{k_y} D(x_g, y_g \mid k_x, k_y; w) 2ik_z D(k_x, k_y \mid x_s, y_s; w),$$

where,
  w is a selected frequency,
  $M(x_g, y_g \mid x_s, y_s; w)$ is a Fourier transform coefficient of said at least one of said one or more multiple reflected signals at said selected frequency,
  $D(x_g, y_g \mid k_x, k_y; w;)$ is a Fourier transform coefficient from a selected transformed shot slice corresponding to said selected frequency,
  $D(k_x, k_y \mid x_s, y_s; w)$ is a Fourier transform coefficient from said a selected transformed receiver slice at said selected frequency,
  $2ik_z$ is an obliquity factor,
  $x_g$ is an X receiver coordinate,
  $y_g$ is a Y receiver coordinate,
  $x_s$ is an X shot coordinate,
  $y_s$ is a Y shot coordinate,
  $k_x$ is an X wavenumber, and,
  $k_y$ is a Y wavenumber.

9. A method of geophysical exploration comprising the steps of:
  a. accessing a plurality of seismic traces acquired over a subsurface exploration target, and wherein at least one of said plurality of seismic traces has one or more multiple reflected events therein;
  b. calculating a time direction discrete first projection transform of said seismic traces;
  c. accessing a shot record comprised of a first plurality of said first projection transformed seismic traces;
  d. accessing a receiver record comprised of a second plurality of said first projection transformed seismic traces;
  e. calculating a plurality of horizontal 2D discrete second projection transforms within said shot record, thereby obtaining a plurality of transformed shot slices;
  f. for each of said plurality of transformed shot slices, selecting a corresponding receiver slice, said transformed shot slice and said corresponding receiver slice having a same first projection transform coefficient associated therewith;
  g. using at least said plurality of transformed shot slices and said corresponding plurality of transformed receiver slices to obtain an estimate of at least one of said one or more multiple reflected events; and, h. using said obtained estimate of at least one of said one or more multiple reflected events to explore said subsurface exploration target, and wherein at least one orb or e is performed on one or more computers.

10. The method of geophysical exploration according to claim 9 wherein said first discrete projection transform is a Fourier transform and wherein said first projection transform coefficient is a frequency.

11. The method of geophysical exploration according to claim 9, wherein said first projection transform and said second projection transform are a same projection transform.

12. The method of geophysical exploration according to claim 11, wherein said first projection transform and said second projection transform are Fourier transforms.

13. The method of geophysical exploration according to claim 9 wherein said first discrete projection transform is selected from a group consisting of a Fourier transform, a fast Fourier transform, a discrete Fourier transform, a Radon transform, a cosine transform, a sine transform, a tau-p transform, and a Walsh transform.

14. The method of geophysical exploration according to claim 9, wherein step (h) comprises the steps of:
   (h1) numerically subtracting said estimate of at least one of said one or more multiple reflected events from at least one seismic trace, thereby forming at least one multiple attenuated seismic trace, and,
   (h2) using said at least one multiple attenuated seismic trace to explore for hydrocarbons within said subsurface exploration target.

15. A method of geophysical exploration comprising the steps of:
   a. accessing a plurality of seismic traces acquired over a subsurface exploration target, and wherein at least one of said plurality of seismic traces has one or more multiple reflected events therein;
   b. calculating a time direction Fourier transform of each of said plurality of said seismic traces;
   c. accessing a shot record comprised of a first plurality of said Fourier transformed seismic traces;
   d. accessing a receiver record comprised of a second plurality of said Fourier transformed seismic traces;
   e. calculating a plurality of horizontal 2D Fourier transforms within said shot record, thereby obtaining a plurality of transformed shot slices;
   f. for each of said plurality of transformed shot slices, selecting a corresponding receiver slice, said transformed shot slice and said corresponding receiver slice having a same frequency associated therewith;
   g. using at least said plurality of transformed shot slices and said corresponding plurality of transformed receiver slices to obtain an estimate of at least one of said one multiply one or more multiple reflected events; and,
   h. using said obtained estimate of at least one of said one or more multiple reflected events to explore within the subsurface exploration target, and
   wherein at least one of b or e is performed on one or more computers.

16. The method of geophysical exploration according to claim 15, wherein step (g) comprises the steps of:
   (g1) using at least said plurality of transformed shot slices and said corresponding plurality of transformed receiver slices to obtain an estimate of a corresponding plurality of Fourier transform coefficients, and,
   (g2) performing an inverse Fourier transform of said plurality of Fourier transform coefficients, thereby obtaining an estimate of at least one of said one or more multiple reflected events.

17. The method of geophysical exploration according to claim 15, wherein step (g) comprises the steps of:
   (g1) selecting an output trace location,
   (g2) selecting a transformed shot slice at least approximately corresponding to a selected frequency value,
   (g3) selecting a transformed frequency slice at least approximately corresponding to said selected frequency value,
   (g4) using at least said selected transformed shot slice and said selected transformed receiver slice to obtain an estimate of a Fourier coefficient of at least one of said one or more multiple reflected events at said output trace location,
   (g5) performing at least steps (g1) though (g4), at least twice for at least two different selected frequency values, thereby obtaining a plurality of estimates of Fourier coefficients of at least one of said one or more multiple reflected events at said output location, and,
   (g6) performing an inverse transform of said plurality of estimates of Fourier coefficients, thereby obtaining an estimate of at least one of said one or more multiple reflected events at said output location.

18. The method of geophysical exploration according to claim 15, wherein step (g) comprises the step of:
   (g1) using at least said plurality of transformed shot slices and said plurality of transformed receiver slices to obtain an estimate of at least one of said one or more multiple reflected events, wherein said estimate of at least one of said one or more multiple reflected events is determined according to the equation:

$$M(x_g, y_g | x_s, y_s; w) = \sum_{k_x} \sum_{k_y} D(x_g, y_g | k_x, k_y; w) 2ik_z D(k_x, k_y | x_s, y_s; w),$$

where,
w is a selected frequency,
$M(x_g, y_g | x_s, y_s; w)$ is a Fourier transform coefficient of said at least one of said one or more multiple reflected events at said selected frequency,
$2ik_z$ is an obliquity factor,
$x_g$ is an X receiver coordinate,
$y_g$ is a Y receiver coordinate,
$x_s$ is an X shot coordinate,
$y_s$ is a Y shot coordinate,
$k_x$ is an X wavenumber, and,
$k_y$ is a Y wavenumber,
$D(x_g, y_g | k_x, k_y; w)$ is a Fourier transform coefficient from a selected transformed shot slice corresponding to said selected frequency, and,
$D(k_x, k_y | x_s, y_s; w)$ is a Fourier transform coefficient from a selected transformed receiver slice corresponding to said selected frequency.

* * * * *